(12) United States Patent
Haseltine

(10) Patent No.: US 6,252,720 B1
(45) Date of Patent: Jun. 26, 2001

(54) OPTICAL SYSTEM AND METHOD FOR REMOTELY MANIPULATING INTERACTIVE GRAPHICAL ELEMENTS ON TELEVISION SCREENS AND THE LIKE

(76) Inventor: Eric C. Haseltine, 1300 Poinsettia, Manhattan Beach, CA (US) 90266

( * ) Notice: Subject to any disclaimer, the term of this patent is extended or adjusted under 35 U.S.C. 154(b) by 0 days.

(21) Appl. No.: 09/378,000

(22) Filed: Aug. 20, 1999

(51) Int. Cl.[7] .................................. G02B 27/14
(52) U.S. Cl. ................... 359/635; 359/637; 359/630; 434/85; 108/10
(58) Field of Search .................... 359/635, 637, 359/630; 434/85, 84; 108/9, 10

(56) References Cited

U.S. PATENT DOCUMENTS

| | | | |
|---|---|---|---|
| 4,371,893 | 2/1983 | Rabeisen | 358/93 |
| 4,807,041 | 2/1989 | Kishi et al. | 358/256 |
| 4,818,048 | 4/1989 | Moss | 350/3.7 |
| 4,846,694 | 7/1989 | Erhardt | 434/365 |
| 4,938,570 | 7/1990 | Majima et al. | 350/351 |
| 5,448,263 | 9/1995 | Martin | 345/173 |
| 5,671,091 * | 9/1997 | Monroe et al. | 359/635 |
| 5,708,461 * | 1/1998 | Kent | 345/177 |
| 5,748,183 | 5/1998 | Yoshimura et al. | 345/173 |
| 6,016,755 * | 1/2000 | Trapani | 108/50.01 |
| 6,049,823 * | 4/2000 | Hwang | 709/218 |

* cited by examiner

Primary Examiner—Georgia Epps
Assistant Examiner—Tim Thompson
(74) Attorney, Agent, or Firm—Christopher Darrow; Douglas Larson; Oppenheimer Wolff & Donnelly

(57) ABSTRACT

An optical virtual touch pad system wherein reflective optics are used to superimpose a virtual image of a television screen display onto a touch-sensitive digitizing surface being operatively contacted by a user-controlled contact member. Alternatively, the system uses reflective optics to superimpose an uninverted virtual image of the digitizing surface and the contact member operating thereon onto the surface of the display. The system thereby, for example, can be used as a user interface to control interactive content on a home television.

82 Claims, 6 Drawing Sheets

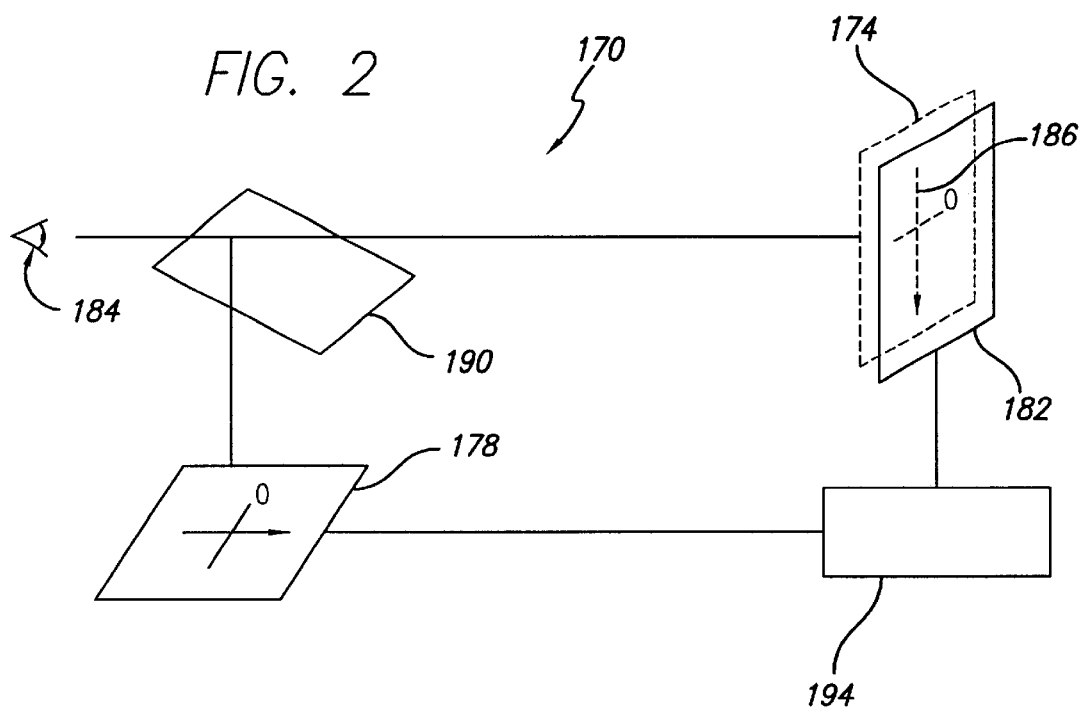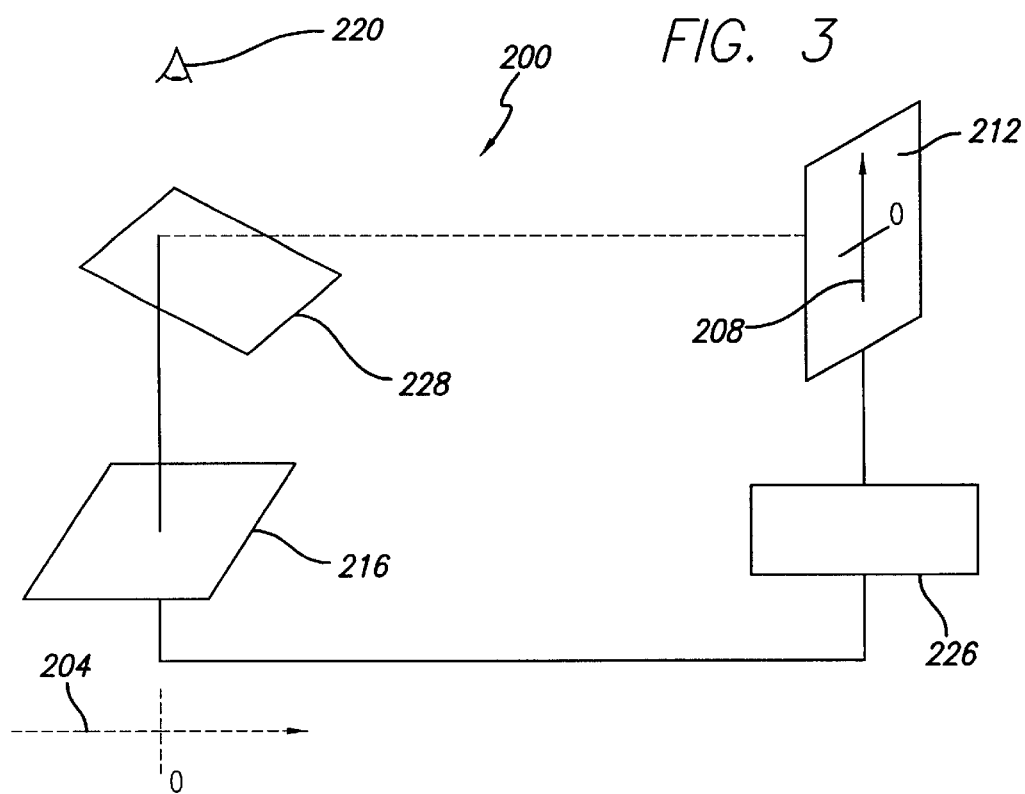

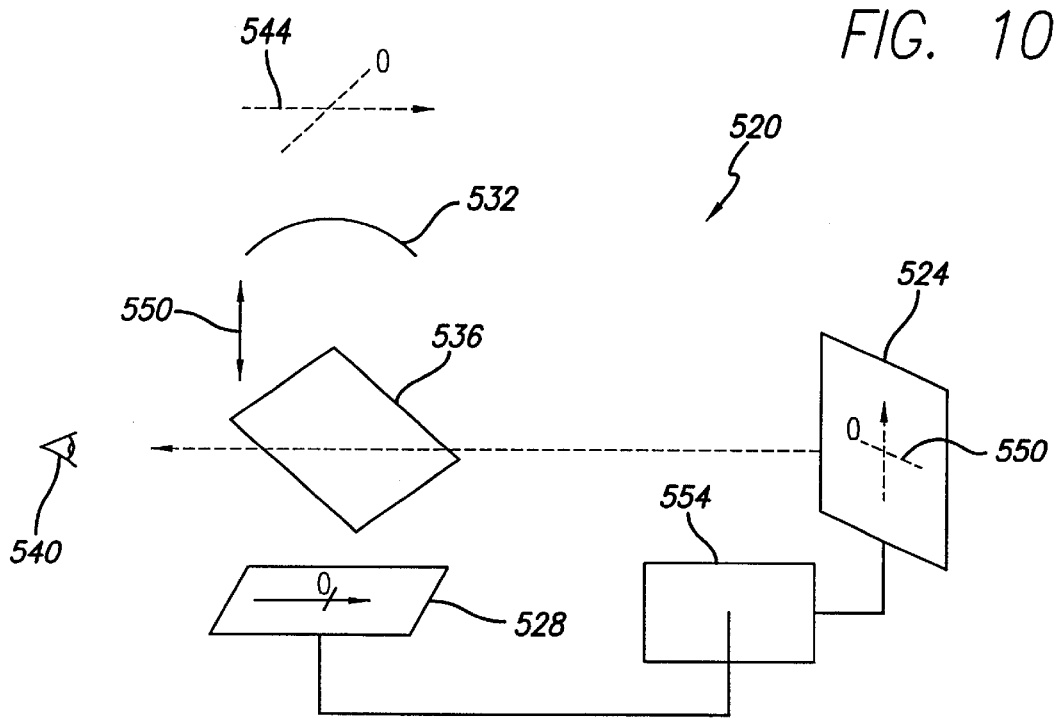
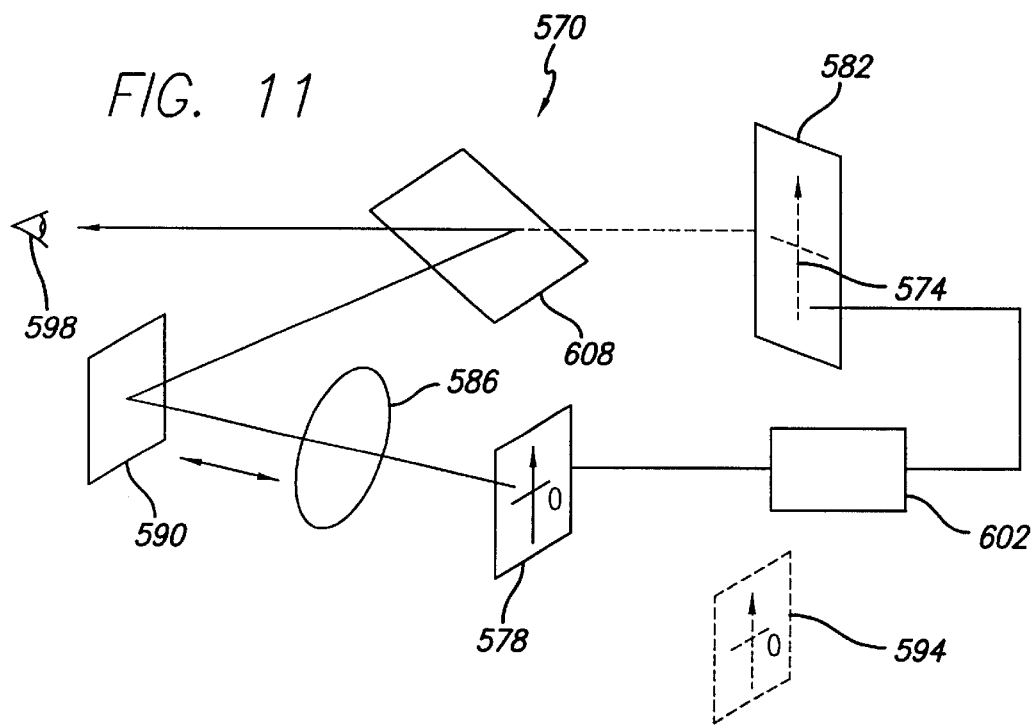

OPTICAL SYSTEM AND METHOD FOR REMOTELY MANIPULATING INTERACTIVE GRAPHICAL ELEMENTS ON TELEVISION SCREENS AND THE LIKE

BACKGROUND OF THE INVENTION

The present invention relates to systems and methods of remotely manipulating or interacting with graphical or interactive elements on television or similar video screens. It further concerns systems and methods whereby users interface to control interactive content on televisions. Additionally, the invention is directed to optical virtual touch pad systems.

Many systems for manipulating graphical and other user interface elements on television, computer, electronic or other display screens are known. Examples thereof include keyboards, mouses, remote control devices (such as hand-held television remote controls and wired consoles), touch screens and voice controlled systems. In the interactive television field, the interface elements can include electronic program guides, web links, option menus and embedded video hot links.

One prior art system for manipulating interface elements is designed for use by animators and artists and keeps their hands and input devices in the actual workspace. This is the "ImaginEasel", workstation at The Walt Disney Company. It is a direct manipulation interface system, allowing an artist to draw on a digitizing surface as if she were using paper and pencil. More specifically, the artist sits at the station, and instead of looking at the monitor, she looks at a superimposed image of the monitor on a digitizing surface. She draws on the digitizing surface as if she were drawing directly on the surface of the monitor.

The underlying concepts of the "ImaginEasel" workstation system are disclosed in U.S. Pat. No. 5,671,091 (Monroe, et al.), whose entire contents are hereby incorporated by reference. The '091 patent teaches a method of superimposing the image of a display onto the surface of a digitizing surface to allow artists to draw in a natural manner. It also describes methods for placing optical components between the display and the digitizing surface to compensate for differences in the sizes of the display and the digitizing surface. The image of the display is electronically inverted to correct for the mirror image reversal caused by a single beamsplitting element. The distances between the display and the beamsplitter and the beamsplitter and the digitizing surface in the '091 system are equal so that the virtual image can be superimposed onto the digitizing surface.

The '091 system, unfortunately, cannot be translated to consumer television and home computing applications. This is because for these applications the optical distances between the display and the digitizing surface to be registered with the display are not set distances, but rather are arbitrary. For example, chairs and couches in all living rooms are not the same fixed distances from their television sets. Another reason is that for these applications it is not generally feasible to electronically invert a displayed image. Since the electronic display on the home television will be viewed by others at the same time as the user, it is undesirable to invert the image.

SUMMARY OF THE INVENTION

Disclosed herein is a low cost system for converting a television or other electronic display into a touch sensitive display, providing an intuitive user interface for games, remote control and other entertainment applications. Reflective optics are used to either superimpose a virtual image of the television (or rather the electronic display of the television screen) onto a touch-sensitive digitizing surface. Or conversely, reflective optics can be used to superimpose a virtual image of a digitizing surface onto the surface of a display, such as that on a television or computer screen. Multiple reflective surfaces rectify virtual image superimposed upon the digitizing surface or display surface. The virtual images of the display and the digitizing surface are registered in the same plane as the corresponding digitizing surface and display, respectively. They are registered using positive or negative optical elements (both refractive and reflective) introduced into an optical path between the display and the digitizing surface.

An underlying idea of this invention is to create a user interface that allows a user to directly manipulate an interactive screen by touching on a graphical or interactive element, but without actually touching a conventional touch screen. The invention can be used to convert an ordinary television so that it can be remotely controlled by a user. She can control it whereby it appears to her that she is actually physically touching the screen when in actuality she is sitting at a typical viewing distance from the television screen and optics are used to make it appear to her that she is actually touching the screen.

One embodiment of the invention uses a beamsplitter positioned in an optical path of a digitizing or touch sensitive surface to superimpose a virtual image of the digitizing surface on the television screen. The digitizing surface is operatively connected to the computer or set-top box that is driving the image on the television screen. The optical path also includes means for registering the virtual image on the television screen and optical (not electronic) means for reversing the reversed image of the beamsplitter.

As the user operatively contacts the digitizing surface with her finger, pen or other contact member, a virtual image of her hand and the contact member is superimposed on the television screen, either with a virtual image of the digitizing surface or without but with the virtual image of the hand being registered with the screen as it is with the surface. The user thereby touches a "perceived" display surface without actually touching the display with her hands. A television (and computer) user can thus directly manipulate icons, controls and other interactive contacts by simply "touching " a virtual image of the screen that she is viewing.

The beamsplitter used in the embodiments herein can be silvered (or aluminized vaporized coatings), partially reflective, that is, simply a piece of glass whose reflectance is controlled by the amount of silvering or deposit on it. It can, for example, have a reflectance on the order of twenty percent and a transmission on the order of about eighty percent. If the light in the room is dim or not sufficient, a separate light to illuminate the user's hand on the digitizing surface may be used.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 2 is a schematic view of a second embodiment;

FIG. 3 is a schematic view of a third embodiment;

FIG. 10 is a schematic view of a tenth embodiment; and

FIG. 11 is a schematic view of an eleventh embodiment.

DETAILED DESCRIPTION OF PREFERRED EMBODIMENTS OF THE INVENTION

Disclosed herein are two different forms of the present invention. In the first form a virtual image of an electronic display is superimposed on a touch-sensitive digitizing surface. In the second form a virtual image of a touch-sensitive surface is superimposed on the electronic display, essentially the converse of the first.

Figure 1:
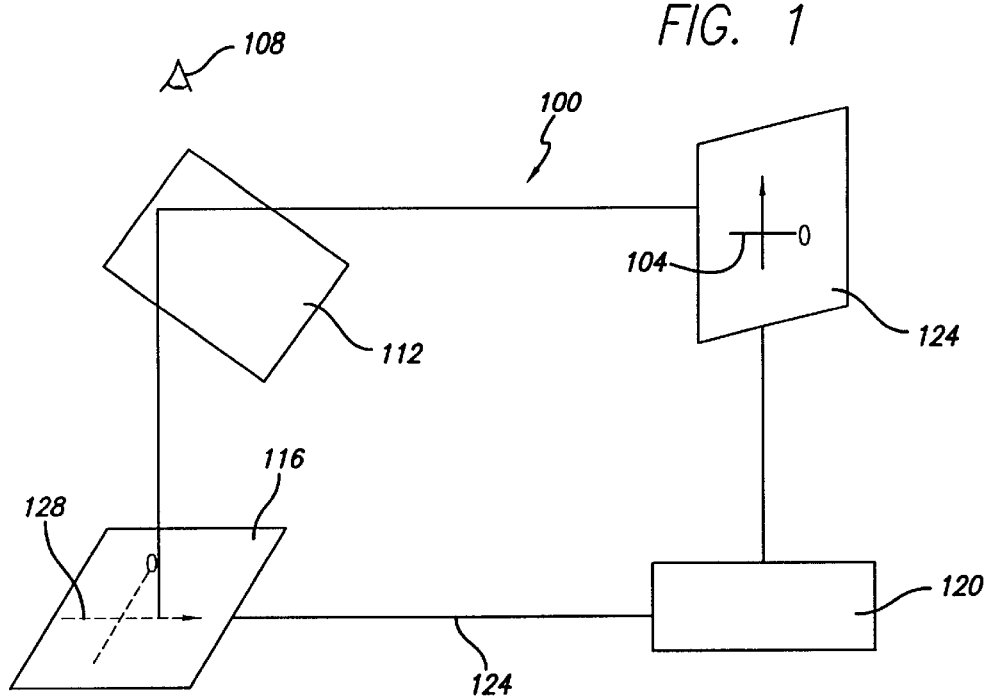
FIG. 1 is a schematic view of a first system embodiment of the present invention.

A basic example of the first form of the invention is illustrated in FIG. 1 by system 100. It is seen therein that an electronic display 104 is viewed by a viewer 108 at an arbitrary distance through a beamsplitter 112 that superimposes the image of the electronic display 104 onto a touch-sensitive "x, y" digitizing surface 116. The digitizing surface 116 can include resistive transducers, surface acoustic wave transducers, capacitive transducers, an array of piezo electric sensors or other digitizing means. Signals from the digitizing surface 116 pass to a computer 120, which generates the electronic image to be viewed along with the graphical representations of the interface. The signals from the digitizing surface 116 can pass either by a wired or wireless link, such as an infrared or RF link, 124 to the computer 120. The computer 120 can be a set-top box, for example.

When a user desires to manipulate a control, link or other video or graphical image (of he electronic display 104 on the display screen 124), she simply touches the portion of the digitizing surface 116 onto which that control or interface has been optically superimposed, the virtual image 128 of the display. Registration of the display screen 124 to the digitizing surface 116 can be made each time the digitizing surface is moved to a new location. One way of registering it is to have the user (108) touch calibration points at the four corners and center of the virtual image 128, while calibration software program is running in the computer 120 to which the digitizing surface 116 is connected. This reregisters the digitizing surface 116 to the coordinates used to define positions of different graphical controls. Because of the mirror inversion of the virtual image, the electronic image has to be inverted as shown in FIG. 1, to appear erect on the digitizing surface 116.

Figure 1A:
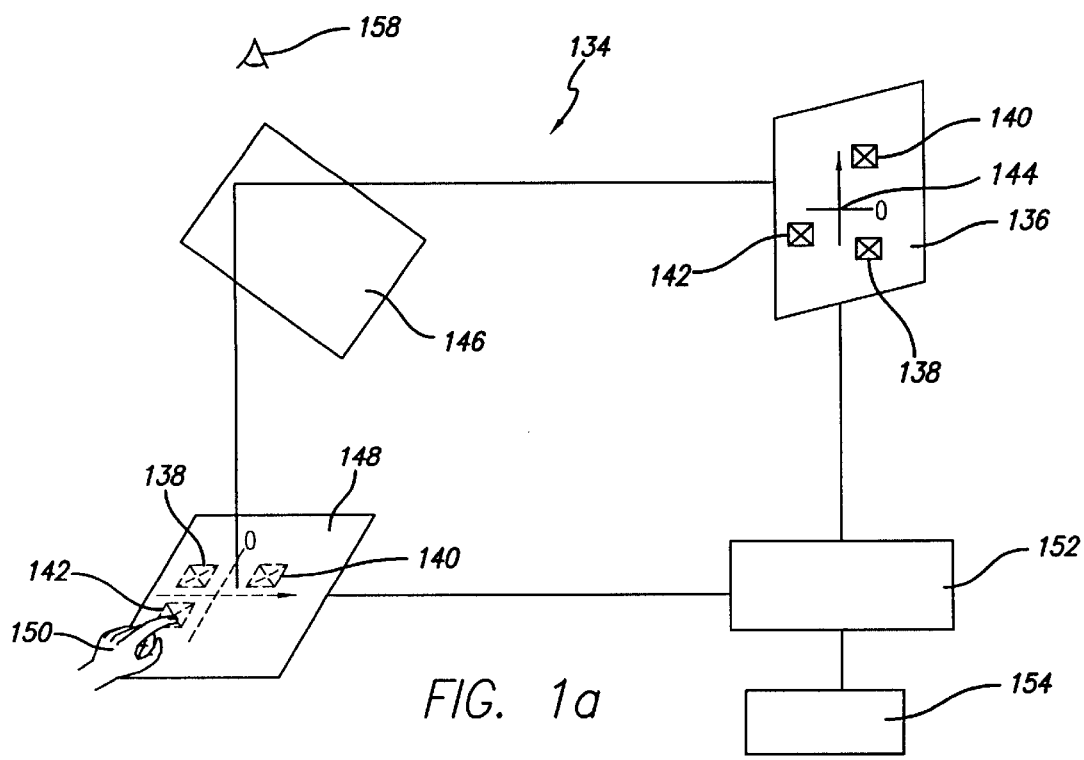
FIG. 1a is a schematic view of a variation of the first embodiment.

An application or variation of the system 100 of FIG. 1 is illustrated in FIG. 1a by system 134. The electronic display on the screen 136, such as a liquid crystal display, of system 134, includes a set of drums 138, 140, 142, as an example. A virtual image 144 of this display is superimposed by the beamsplitter 146 on the digitizing surface 148 (or touch sensitive pad) with the image of each drum 138, 140, 142 being registered with corresponding discrete (piezoelectric) sensors therebelow of the digitizing surface 148. The user then taps with her finger or other contact member 150, as shown in FIG. 1a, on the virtual image of the desired drum. The signal corresponding to the tapping motion on the specific portion of the surface 148 is transmitted to the computer 152. The computer 152 then instructs a synthesizer 154 to produce a sound corresponding to the specific drum of the set of drums which the user 158 selected. The digitizing surface 148 is thereby transformed into a "drum pad." The beamsplitter 146 can be mounted on an arm or pedestal that also supports the digitizing surface 116.

An example of the second form of the present invention is shown in FIG. 2 by system 170. The virtual image 174 of the digitizing surface 178 of system 170 is superimposed on the remotely-viewed display screen 182. This allows a viewer 184 to look directly at the screen 182 as opposed to a virtual image of the screen. As the viewer 184 looks through the beamsplitter 190, she sees a virtual image 186 of her hand on the (television) screen 182. As she moves her hand relative to the digitizing surface 178, it correspondingly "moves" on the screen 182. Thus, when she touches a specific portion of the digitizing surface 178, this portion, as controlled by the computer 194, corresponds to the portion of the display on the screen 182. The screen display portion can be a button of a graphical design, such that the user thereby effectively "clicks" on the button, by tapping on a corresponding portion on the digitizing surface 178.

Both forms of the invention, as depicted in FIGS. 1 and 2, by systems 100, 134 accomplish the basic task of superimposing an image of an electronic display in an arbitrary viewing distance. However, both forms of the invention require that the original image be geometrically inverted to compensate for the up-down image reversal caused by the beamsplitter. Such reversal is inconvenient if there are multiple viewers.

Another limitation of the systems of FIGS. 1 and 2 is that the images of the display screen and digitizing surface, although alignable in "x, y" coordinates at all viewing distances, are registered only if the distance between the display and the beamsplitter is equal to the distance between the digitizing surface and the beamsplitter. For viewing distances greater than arms length, optically superimposing the display in the digitizing surface in depth would require that the digitizing surface be placed beyond the reach of the viewer.

Accordingly, the system 200 of FIG. 3 shows how the virtual image 204 of the actual electronic image 208 on the display screen 212 is positioned at a greater depth than the digitizing surface 216. This causes the viewer 220 to refocus from one image to another or potentially requiring the digitizing surface 216 to be moved to an inconvenient distance. The digitizing surface 216 and the display screen 212 are both connected to a computer 226. As an example and still referring to FIG. 3, the viewer 220 is watching through beamsplitter 228 her television screen 212, for example, which is ten feet away, and her coffee table (supporting the digitizing surface 216) is a couple feet away from her eyes. Therefore, the virtual image 204 of the display would be well below the digitizing surface 216 and there would thus be a misregistration in depth of the images. Additionally, the image is inverted left to right.

Figure 4:
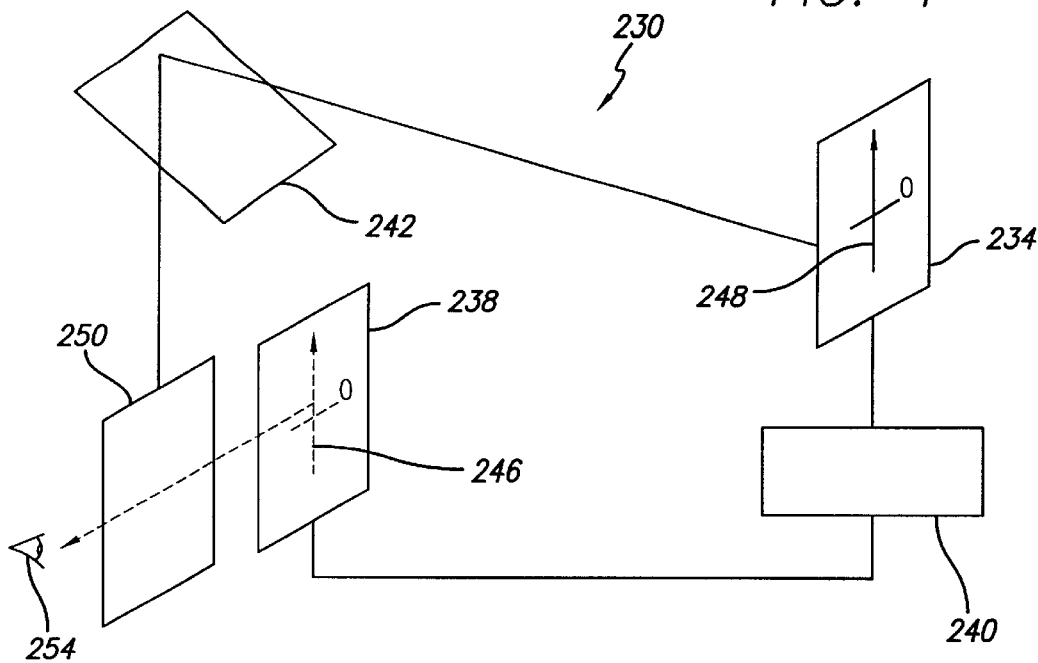
FIG. 4 is a schematic view of a fourth embodiment.

The system 230 of FIG. 4 solves the inversion problem without the need for and disadvantages of electronic inversion. Additionally, the system 230 shows the user's hand moving left to right as it would be on the screen display 234 and having the control surfaces embedded virtually in the television screen from the left to right the way they are on the digitizing surface 238, which is operatively connected to a computer 240. Therefore, a front surface mirror 242 is positioned in the optical path between the display screen 234 and the digitizing surface 238 to correct for the "up-down" mirror inversion of a virtual image 246 of an actual image 248 of the screen formed by the beamsplitter 250 and as viewed by viewer 254. In other words, the reversal comes through passing through a front surface mirror 242 and then a beamsplitter 250. This gives "a reversal of the reversal" and causes the image to line up properly. So while the system 230 solves the inversion problem, it does not necessarily solve the problem of registering in depth.

Figure 5:
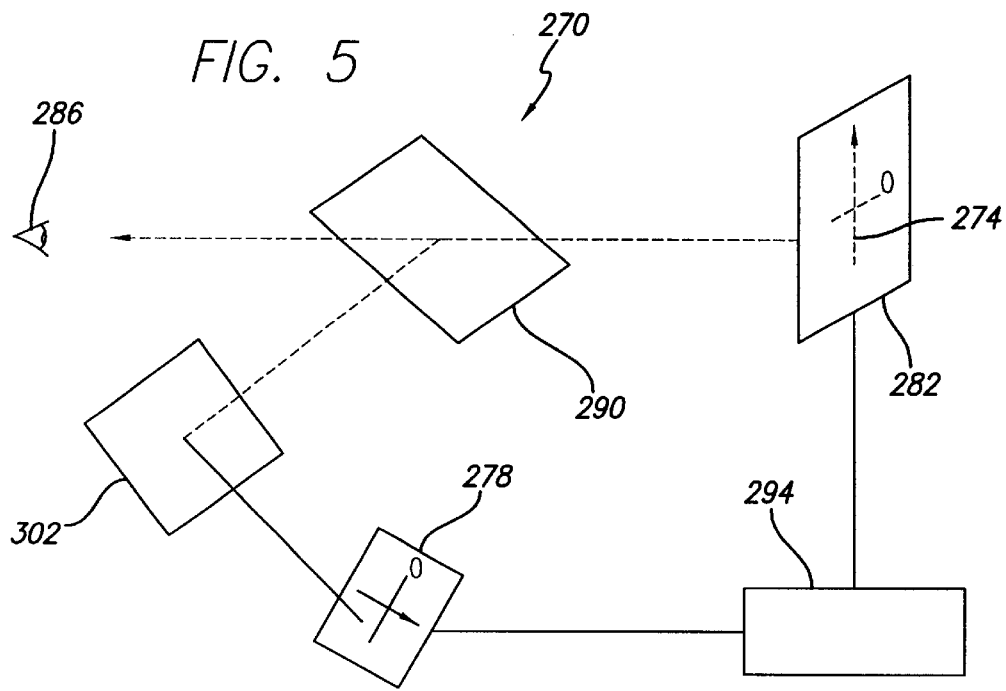
FIG. 5 is a schematic view of a fifth embodiment.

The system 270 of FIG. 5 then shows how an inverted image 274 of the digitizing surface 278 can be superimposed on a display screen 282 viewed by a viewer 286 looking through a beamsplitter 290. The screen 282 and digitizing surface 278 are operatively connected by a computer 294 with either a wired or wireless connection. With system 270 the viewer 286 can view an inverted image 274 of her own hands operating on the digitizing surface 278, but superimposed on the display screen 282. Similar to the system 230 of FIG. 4, the system 270 of FIG. 5 also employs a beamsplitter 290 and a front surface mirror 302 to superimpose images and to correct for "up-down" inversion.

Figure 6:
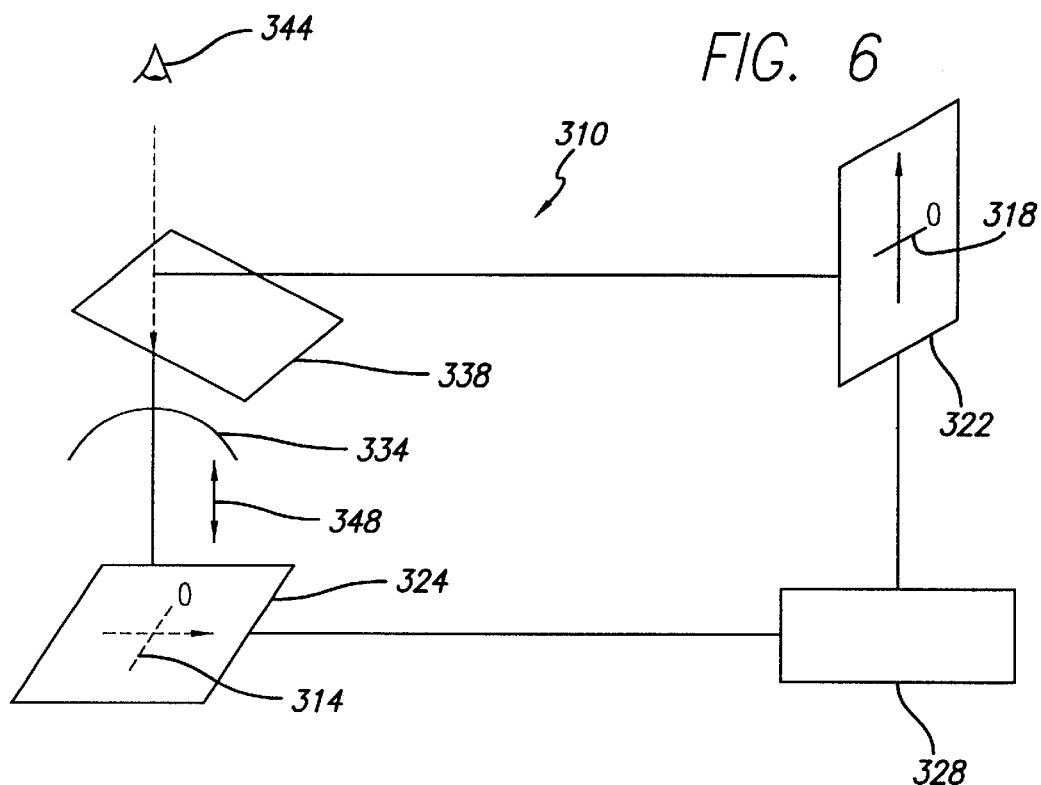
FIG. 6 is a schematic view of a sixth embodiment.

The system 310 of FIG. 6 shows a virtual image 314 of an image 318 on a display screen 322 being superimposed and reregistered, without inversion, at the same depth as a digitizing surface 324. A computer 328 is operatively connected to the digitizing surface 324 and the display screen 322. A partially-reflective convex mirror 334 is positioned between a partially reflective beamsplitter 338 and the digitizing surface 324; and thereby an inverted virtual image 314 of the display screen 322 is formed in the plane of the digitizing surface 324. Light rays from the display screen 322 reflect from the beamsplitter 338 onto the convex mirror 334, which then reflects the rays back through the beamsplitter. An erect virtual image 314, as seen by viewer 344, is formed whose depth can be adjusted, as shown by the two-headed arrow 348, to lie exactly in the plane of the digitizing surface 324 by adjusting the separation between the convex mirror 334 and the digitizing surface 324. Because both the beamsplitter 338 and the convex mirror 334 are partially reflective, a user 344 can see her hands on the digitizing surface 324. She is looking at the superimposed image 314 of the display image 318 on the digitizing surface 324 instead of looking at the (television) screen 322 directly.

Figure 7:
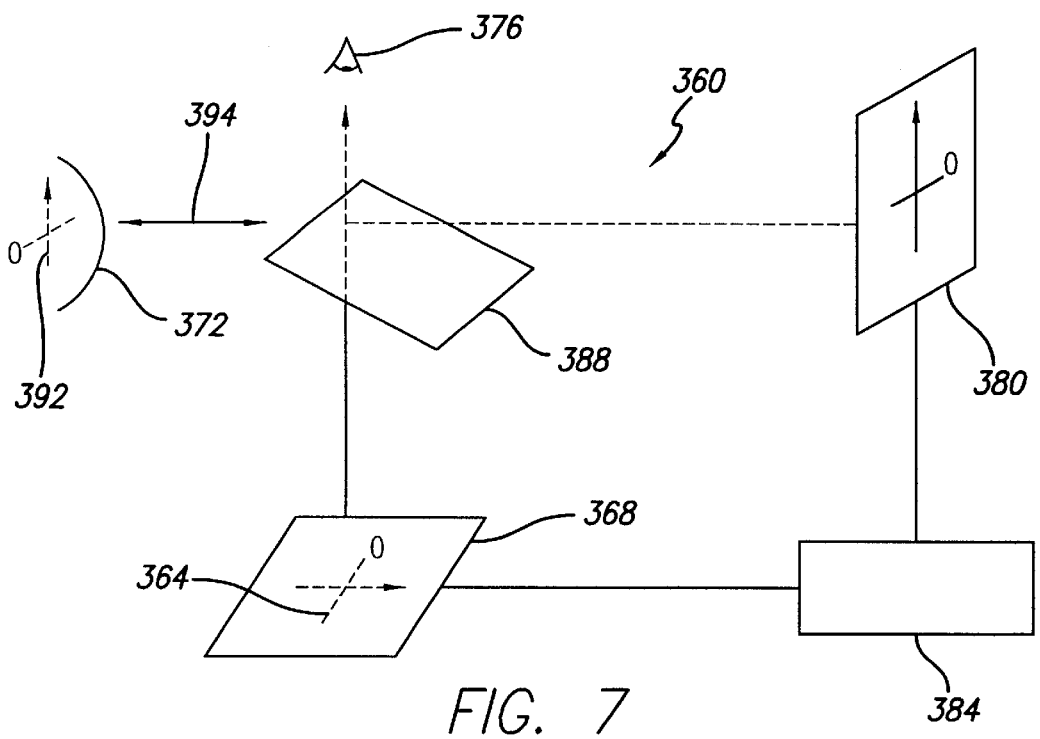
FIG. 7 is a schematic view of a seventh embodiment.

The system 360 of FIG. 7 provides an erect superimposition of a virtual screen image 364 on a digitizing surface 368 by positioning a front surface convex mirror 372 at right angles to the view of the user 376 of the digitizing surface. The components of system 360 are positioned such that light rays from the electronic display 380 (which is connected to the computer 384) pass through the partially-reflective beamsplitter 388, then are reflected from the convex mirror 372, forming a virtual image 392. This virtual image 392 upon subsequent reflection from the beamsplitter 388 forms in the plane of the digitizing surface 368. Similar to the system 310 of FIG. 6, adjusting the distance between the beamsplitter 388 and the convex mirror 327, as shown by two-headed arrow 394, moves the virtual image 364 to the same depth as the digitizing surface 368 when the viewing distance to the screen 380 is changed. In other words, FIG. 7 shows a negative mirror 372 that reflects the image 392. And the viewer 376 sees the reflected uninverted virtual image 364 superimposed on the digitizing surface 368.

Figure 8:
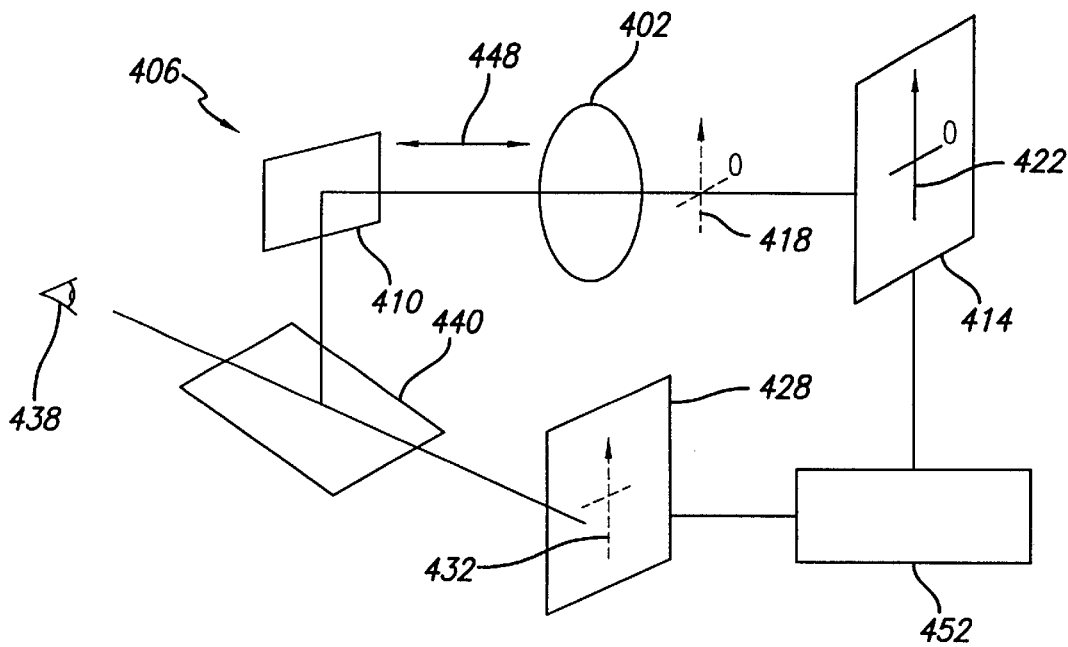
FIG. 8 is a schematic view of an eighth embodiment.

Instead of using a negative mirror (372), a negative lens 402 can be used with a similar result as shown by the system 406 of FIG. 8. The negative lens 402, for example, can be a very inexpensive Fresnel lens. This negative lens 402 is positioned between the front surface mirror 410 and the display screen 414. It creates a minified virtual image 418 at a smaller distance from the screen 414 than would otherwise be the case if the lens were not there. Using two mirrors, the virtual image 418 of the image 422 of the screen 414 is superimposed onto the digitizing surface 428 as shown by virtual image 432. Since the negative lens 402 does not invert the image, two mirrors are required.

That is, FIG. 8 shows another system of forming an uninverted virtual image 432 of the screen on the same plane as the digitizing surface 436, as seen by viewer 438. The negative optical element 402 is placed between the electronic display 414 and a front surface mirror 410 that reflects a virtual image 418 of the screen, formed by the negative lens, into a beamsplitter 440. The beamsplitter 440 superimposes the virtual image 418 onto the digitizing surface 436. The distance between the negative lens 402 and the front surface mirror 440 can be adjusted, as shown by the double-headed arrow 448, to compensate for varying viewing distances. Also, a computer 452, such as a set-top box, is connected to the digitizing surface 436 and to the display screen 414.

Figure 9:
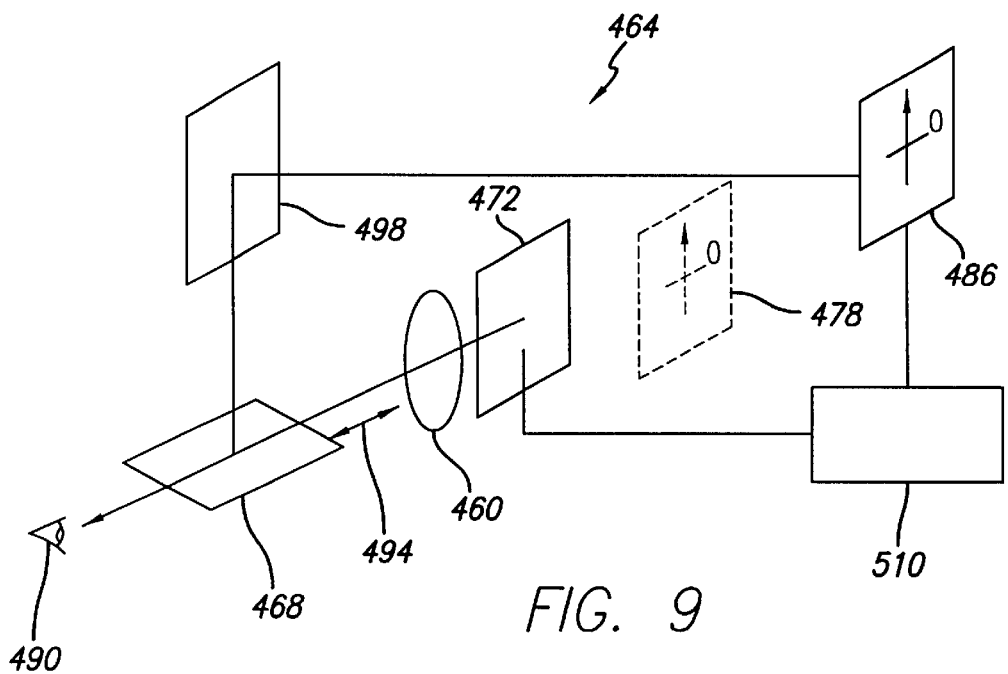
FIG. 9 is a schematic view of a ninth embodiment.

A positive optical element 460, such as a positive plastic Fresnel lens, is used in the system 464 of FIG. 9. The positive optical element 460 is positioned between the beamsplitter 468 and the digitizing surface 472 such that a virtual magnified image 478 of the digitizing surface is formed in the same plane as the image of the electronic display 486. Thereby, both the digitizing surface 472 and the hands of the viewer 490 are seen at the same depth as the electronic display. Changing the separation between the positive lens 460 and the beamsplitter 468, as shown by the double-headed arrow 494, compensates for different viewing distances. FIG. 9 shows that an uninverted virtual image of a display screen can be formed in the plane of a digitizing surface 472.

In other words, in the system 464 of FIG. 9 a positive lens 460 is placed in front of the digitizing surface 472 to position it at the same distance as the television or other display screen 486. Thus, instead of making the television screen 486 appear to be only a few feet away, the digitizing surface 472 appears to be many feet away to correspond with the display. By using a front surface mirror 498 and a beamsplitter 468, the user 490 is looking at the digitizing surface 472 through the positive lens 460, which creates a magnified virtual image 478 at a longer distance. The user thus has the sensation that she is actually touching the television screen 468. Again, the display screen 486 and the digitizing surface 472 are both operatively connected to a computer 510, such as a set-top box.

The system 520 of FIG. 10 optically registers images of the screen 524 and the digitizing surface 528 "up-down" and in-depth. This is accomplished by placing a concave mirror or positive Fresnel mirror 532 above a beamsplitter 536 through which a viewer 540 looks directly at the screen 524. The concave mirror or positive Fresnel mirror 532 forms a virtual magnified image 544 of the digitizing surface 528, similar to looking at the back side of a spoon. This image 544 is reflected at a right angle by the beamsplitter 536 to lie in the plane of the display screen 524, as shown by virtual image 550. By adjusting the concave mirror-beamsplitter positioning, as depicted by the double-headed arrow 550, different viewing distances can be accommodated.

The system 520 of FIG. 10 is thus a rather elegant solution to the problems solved by the present invention. The viewer 540 is looking through the beamsplitter 536, and sees a virtual image of the digitizing surface 528 on the (television) screen 524, which is operatively connected to a computer 554. The concave positive mirror 532 optically produces a virtual image 544 of the digitizing surface, and this virtual image is superimposed by the beamsplitter 536 on the display screen 524 as virtual image 550. System 520 is a preferred system of this invention since it only uses two elements, namely the front surface positive mirror 532 and the beamsplitter 526. It further superimposes the image of the user's hand and the digitizing surface 528 on the television screen 524 providing an intuitively simple operation means.

As an example, a web page can be on the television screen 524 in a WebTV arrangement. The user or viewer 540 then controls the "buttons" on the web page by moving her fingers (or other manual contact member) on a digitizing surface 528 in front of her. The user 540 looking through the beamsplitter 536 sees her fingers on the screen 524. However, others in the room, looking at the screen 524, will not see her fingers. The user 540 thereby can control the interactive content on the television screen 524.

The system 570 of FIG. 11 also forms an inverted image 574 of a digitizing surface 578 directly onto the plane of the electronic display 582. This is done by placing a positive optical element 586, such as a plastic Fresnel lens, between the digitizing surface 578 and a front surface mirror 590. This causes an uninverted magnified virtual image 594 of the digitizing surface 578 to be superimposed on the plane of the electronic display that is viewed by the viewer 598 through the beamsplitter.

In other words, an image of the digitizing surface 578 is being superimposed onto the television screen 582, which is connected to the computer 602. And this is done by providing a positive lens 586 that is looking at the digitizing surface 578. A front surface mirror 590 reflects into a beamsplitter 608 that the viewer 598 is looking through, which superimposes the image of her hand and the digitizing surface 578 onto the television screen 582. Referring to FIG. 11, the positive lens 586 itself is creating a virtual image 594 that is floating in space at a desired distance. The viewer 598 is essentially looking at that virtual image through the two mirrors, namely, the front surface mirror 604 and the beamsplitter 608. The elements of system 570 are arranged such that the viewer 598 sees the virtual image of the digitizing surface 578 on the plane of the electronic display 582.

The present invention allows the user to see and move her hand relative to an actual or virtual image of the electronic display of the screen. Through a computer hook-up, the user interacts with the display by contacting a touch pad, remote from the display. The user sees a reflective virtual image of her hand through a beamsplitter arrangement at the same depth as the screen. Either the reflective image is positioned to overlay the screen or the screen overlays the hand. The user "sees" her hand either way, which is an intuitively natural operating system.

From the foregoing detailed description, it will be evident that there are a number of changes, adaptations and modifications of the present invention which come within the province of those skilled in the art. For example, optical systems not using beamsplitter can be used as would be apparent to those skilled in the art. However, it is intended that all such variations not departing from the spirit of the invention be considered as within the scope thereof.

What is claimed is:

1. A system, comprising:
 a display screen;
 a touch-sensitive digitizing surface;
 a computer operatively connected to the display screen and to the digitizing surface; and
 a beamsplitter positioned to optically superimpose a virtual image of the digitizing surface on the display screen.

2. The system of claim 1 wherein the digitizing surface includes resistive transducers, surface acoustic wave transducers, capacitive transducers or piezo-electric sensors.

3. The system of claim 1 wherein the computer is a set-top box.

4. A system, comprising:
 a touch-sensitive digitizing surface having an operative surface portion;
 a display screen; and
 optical means for optically superimposing on an electronic display of the display screen a virtual image of the digitizing surface and of a contact member manipulated relative to the operative surface portion by a person generally as the person views the virtual image through the optical means.

5. The system of claim 4 wherein the digitizing surface includes resistive transducers, surface acoustic wave transducers, capacitive transducers or piezo-electric sensors.

6. The system of claim 4 further comprising a computer operatively connected to the display screen and to the digitizing surface.

7. The system of claim 1 wherein the contact member is a pointer unit, a writing instrument, a finger of the person or a hand of the person.

8. The system of claim 4 wherein the optical means include a beamsplitter and forming means for forming a virtual magnified image of the digitizing surface which is reflected by the beamsplitter to lie in a plane of the display screen.

9. The system of claim 4 wherein the optical means includes a beamsplitter and superimposing means for superimposing an uninverted, magnified virtual image of the digitizing surface on a plane of the display screen when viewed by the person through the beamsplitter.

10. A system, comprising:
 a touch-sensitive digitizing surface having an operative surface portion;
 a display screen; and
 a beamsplitter system which optically superimposes on an electronic display of the display screen a virtual image of the digitizing surface and of a contact member manipulated relative to the operative surface portion by a person generally as the person views the virtual image.

11. The system of claim 10 wherein the digitizing surface includes resistive transducers, surface acoustic wave transducers, capacitive transducers or piezo-electric sensors.

12. The system of claim 10 wherein the contact member is a pointer unit, a writing instrument or a finger of the person.

13. The system of claim 10 further comprising a computer operatively connected to the display screen and to the digitizing surface.

14. A system, comprising:
 a display screen;
 a touch-sensitive digitizing surface;
 a beamsplitter system which optically superimposes on the digitizing surface a virtual image of an electronic display of the display screen;
 the surface including a surface portion thereof corresponding to at least a portion of the virtual image; and
 the surface portion being operatively contactible with a contact member by a person generally positioned to view the virtual image.

15. The system of claim 14 wherein the digitizing surface includes resistive transducers, surface acoustic wave transducers, capacitive transducers or piezo-electric sensors.

16. The system of claim 14 further comprising a computer operatively connected to the display screen and to the digitizing surface.

17. The system of claim 14 wherein the contact member is a pointer unit, a writing instrument, a finger of the person or a hand of the person.

18. A system, comprising:
a display screen;
a touch-sensitive digitizing surface;
optical means for optically superimposing on the digitizing surface a virtual image of an electronic display of the display screen;
the surface including a surface portion thereof corresponding to at least a portion of the virtual image; and
the surface portion being operatively contactable with a contact member by a person positioned generally to view the virtual image.

19. The system of claim 18 wherein the digitizing surface includes resistive transducers, surface acoustic waver transducers, capacitive transducers or piezo-electric sensors.

20. The system of claim 18 further comprising a computer operatively connected to the display screen and to the digitizing surface.

21. The system of claim 18 wherein the contact member is a pointer unit, a writing instrument, a finger of the person or a hand of the person.

22. A system, comprising:
a display screen;
a touch-sensitive digitizing surface;
a computer operatively connected to the display screen and to the digitizing surface; and
a beamsplitter positioned to optically superimpose a virtual image of an electronic display of the display screen on the digitizing surface.

23. The system of claim 22 wherein the digitizing surface includes resistive transducers, surface acoustic waver transducers, capacitive transducers or piezo-electric sensors.

24. The system of claim 22 wherein the computer is set-top box.

25. A system, comprising:
a display screen;
a digitizing surface operatively connected to the display screen;
an optical element which produces a virtual image of the digitizing surface; and
a beamsplitter which superimposes the virtual image onto the display screen.

26. The system of claim 25 wherein the optical element is a positive mirror.

27. The system of claim 25 wherein the optical element is a positive lens.

28. The system of claim 25 further comprising a set-top box operatively connected to the digitizing surface and the display screen.

29. The system of claim 25 wherein the display screen is a television screen.

30. The system of claim 25 wherein the distance of the positive optical element from the beamsplitter is adjustable to position the virtual image at the same distance from the beamsplitter as the screen is from the beamsplitter.

31. The system of claim 25 wherein the virtual image includes a virtual image of a contact member manipulated relative to the digitizing surface by the person viewing through the beamsplitter the superimposed virtual image on the display screen.

32. The system of claim 31 wherein the contact member includes a portion of a hand of the user.

33. A method, comprising the steps of:
providing a screen having an electronic display;
providing a digitizing surface spaced from the screen;
using reflective optics, superimposing a virtual image of the electronic display on the digitizing surface; and
while viewing the superimposed virtual image, operatively contacting with a contact member a portion of the digitizing surface and relative to the superimposed virtual image.

34. The method of claim 33 wherein the virtual image is registered with the digitizing surface.

35. The method of claim 33 wherein the screen is an interactive television screen which is operatively connected to a set-top box.

36. The method of claim 33 wherein the portion defines a first surface portion, and the digitizing surface includes a second surface portion generally spaced from the first surface portion, a first touch-sensitive sensor at the first surface portion and a second touch-sensitive sensor at the second surface portion.

37. A method, comprising the steps of:
providing a screen having an electronic display;
providing a digitizing surface spaced from the screen;
operatively contacting with a contact member a portion of the digitizing surface;
using reflective optics, superimposing virtual images of the contact member and of the digitizing surface on the screen; and
the operatively contacting step being while viewing the electronic display and the virtual images.

38. The method of claim 37 wherein the virtual image of the digitizing surface is registered with the electronic display.

39. The method of claim 37 wherein the portion defines a first surface portion, and the digitizing surface includes a second surface portion generally spaced from the first surface portion, a first touch-sensitive sensor at the first surface portion and a second touch-sensitive sensor at the second surface portion.

40. The method of claim 37 wherein the screen is an interactive television screen which is operatively connected to a set-top box.

41. A method, comprising the steps of:
manipulating a contact member relative to a digitizing surface, which is operatively connected to a display screen; and
during the manipulating step, viewing a virtual image of the contact member superimposed on the display screen.

42. The method of claim 41 wherein the virtual element is produced by a positive optical element and the viewing is through a beamsplitter.

43. The method of claim 42 further comprising adjusting the distance of the positive optical element from the beamsplitter to be the same distance as from the beamsplitter to the display screen.

44. The method of claim 41 wherein optical elements are used to align the virtual image.

45. A system, comprising:
a display screen;
a touch-sensitive digitizing surface;
a beamsplitter positioned to optically superimpose a virtual image of the digitizing surface on the display screen.

46. A system, comprising:
a display screen;
a touch-sensitive digitizing surface;
a computer operatively connected to the display screen and to the digitizing surface; and
a beamsplitter positioned to optically superimpose a virtual image of the digitizing surface on the display screen;
wherein the display screen is an interactive television screen.

47. A system, comprising:
a display screen;
a touch-sensitive digitizing surface;
a computer operatively connected to the display screen and to the digitizing surface;
a beamsplitter positioned to optically superimpose a virtual image of the digitizing surface on the display screen; and
a front surface mirror positioned in an optical path between the display screen and the digitizing surface.

48. A system, comprising:
a display screen;
a touch-sensitive digitizing surface;
a computer operatively connected to the display screen and to the digitizing surface;
a beamsplitter positioned to optically superimpose a virtual image of the digitizing surface on the display screen; and
a positive mirror positioned to form a virtual magnified image of the digitizing surface which is reflected by the beamsplitter to lie in a plane of the display screen.

49. A system, comprising:
a display screen;
a touch-sensitive digitizing surface;
a computer operatively connected to the display screen and to the digitizing surface;
a beamsplitter positioned to optically superimpose a virtual image of the digitizing surface on the display screen; and
a front surface mirror and a positive optical element between the digitizing surface and the front surface mirror.

50. A system, comprising:
a touch-sensitive digitizing surface having an operative surface portion;
a display screen; and
optical means for optically superimposing on an electronic display of the display screen a virtual image of the digitizing surface and of a contact member manipulated relative to the operative surface portion by a person generally as the person views the virtual image through the optical means;
wherein the display screen is an interactive television screen.

51. A system, comprising:
a touch-sensitive digitizing surface having an operative surface portion;
a display screen; and
optical means for optically superimposing on an electronic display of the display screen a virtual image of the digitizing surface and of a contact member manipulated relative to the operative surface portion by a person generally as the person views the virtual image through the optical means;
wherein the optical means includes a beamsplitter and correcting means for optically correcting inversion of a virtual image formed by the beamsplitter.

52. A system, comprising:
a touch-sensitive digitizing surface having an operative surface portion;
a display screen; and
optical means for optically superimposing on an electronic display of the display screen a virtual image of the digitizing surface and of a contact member manipulated relative to the operative surface portion by a person generally as the person views the virtual image through the optical means;
wherein the correcting means includes a front surface mirror.

53. A system, comprising:
a touch-sensitive digitizing surface having an operative surface portion;
a display screen;
optical means for optically superimposing on an electronic display of the display screen a virtual image of the digitizing surface and of a contact member manipulated relative to the operative surface portion by a person generally as the person views the virtual image through the optical means;
wherein the optical means include a beamsplitter and forming means for forming a virtual magnified image of the digitizing surface which is reflected by the beamsplitter to lie in a plane of the display screen; and
wherein the forming means includes a concave mirror or a positive Fresnel mirror.

54. A system, comprising:
a touch-sensitive digitizing surface having an operative surface portion;
a display screen; and
optical means for optically superimposing on an electronic display of the display screen a virtual image of the digitizing surface and of a contact member manipulated relative to the operative surface portion by a person generally as the person views the virtual image through the optical means;
wherein the optical means includes a beamsplitter and superimposing means for superimposing an uninverted, magnified virtual image of the digitizing surface on a plane of the display screen when viewed by the person through the beamsplitter; and
wherein the superimposing means includes a front surface mirror and a positive optical element between the digitizing surface and the front surface mirror.

55. A system, comprising:
a touch-sensitive digitizing surface having an operative surface portion;
a display screen; and
a beamsplitter system which optically superimposes on an electronic display of the display screen a virtual image of the digitizing surface and of a contact member manipulated relative to the operative surface portion by a person generally as the person views the virtual image;

wherein the display screen is an interactive television screen.

56. A system, comprising:

a touch-sensitive digitizing surface having an operative surface portion;

a display screen; and a beamsplitter system which optically superimposes on an electronic display of the display screen a virtual image of the digitizing surface and of a contact member manipulated relative to the operative surface portion by a person generally as the person views the virtual image;

wherein the beamsplitter system includes a beamsplitter and a front surface mirror which corrects virtual image inversion of the beamsplitter.

57. A system, comprising:

a touch-sensitive digitizing surface having an operative surface portion;

a display screen; and a beamsplitter system which optically superimposes on an electronic display of the display screen a virtual image of the digitizing surface and of a contact member manipulated relative to the operative surface portion by a person generally as the person views the virtual image;

wherein the beamsplitter system includes a beamsplitter and a positive mirror which forms an image of the digitizing surface, the image being reflected by the beamsplitter to lie in a plane of the display screen.

58. A system, comprising:

a touch-sensitive digitizing surface having an operative surface portion;

a display screen; and a beamsplitter system which optically superimposes on an electronic display of the display screen a virtual image of the digitizing surface and of a contact member manipulated relative to the operative surface portion by a person generally as the person views the virtual image;

wherein the beamsplitter system includes a front surface mirror, a beamsplitter between the display screen and the front surface mirror and a positive optical element between the front surface mirror and the digitizing surface.

59. A system, comprising:

a display screen;

a touch-sensitive digitizing surface;

a beamsplitter system which optically superimposes on the digitizing surface a virtual image of an electronic display of the display screen;

the surface including a surface portion thereof corresponding to at least a portion of the virtual image; and the surface portion being operatively contactible with a contact member by a person generally positioned to view the virtual image;

wherein the display screen is an interactive television screen.

60. A system, comprising:

a display screen;

a touch-sensitive digitizing surface;

a beamsplitter system which optically superimposes on the digitizing surface a virtual image of an electronic display of the display screen;

the surface including a surface portion thereof corresponding to at least a portion of the virtual image; and the surface portion being operatively contactible with a contact member by a person generally positioned to view the virtual image;

wherein the beamsplitter system includes a beamsplitter and a front surface mirror which corrects virtual image inversion of the beamsplitter.

61. A system, comprising:

a display screen;

a touch-sensitive digitizing surface;

a beamsplitter system which optically superimposes on the digitizing surface a virtual image of an electronic display of the display screen;

the surface including a surface portion thereof corresponding to at least a portion of the virtual image; and the surface portion being operatively contactible with a contact member by a person generally positioned to view the virtual image;

wherein the beamsplitter system includes a partially reflective beamsplitter and a partially-reflective convex mirror between the partially reflective beamsplitter and the digitizing surface.

62. A system, comprising:

a display screen;

a touch-sensitive digitizing surface;

a beamsplitter system which optically superimposes on the digitizing surface a virtual image of an electronic display of the display screen;

the surface including a surface portion thereof corresponding to at least a portion of the virtual image; and the surface portion being operatively contactible with a contact member by a person generally positioned to view the virtual image;

wherein the beamsplitter system includes a partially reflective beamsplitter and a front surface convex mirror at a right angle to a view of the person of the digitizing surface through the beamsplitter.

63. A system, comprising:

a display screen;

a touch-sensitive digitizing surface;

a beamsplitter system which optically superimposes on the digitizing surface a virtual image of an electronic display of the display screen;

the surface including a surface portion thereof corresponding to at least a portion of the virtual image; and the surface portion being operatively contactible with a contact member by a person generally positioned to view the virtual image;

wherein the beamsplitter system includes a front surface mirror, a negative lens between the display screen and the front surface mirror and a beamsplitter between the front surface mirror and the digitizing surface.

64. A system, comprising:

a display screen;

a touch-sensitive digitizing surface;

a beamsplitter system which optically superimposes on the digitizing surface a virtual image of an electronic display of the display screen;

the surface including a surface portion thereof corresponding to at least a portion of the virtual image; and the surface portion being operatively contactible with a contact member by a person generally positioned to view the virtual image;

wherein the beamsplitter system includes a beamsplitter and a positive optical element between the beamsplitter and the digitizing surface.

65. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image; and the surface portion being operatively contactable with a contact member by a person positioned generally to view the virtual image;

wherein the display screen is an interactive television screen.

66. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image; and the surface portion being operatively contactable with a contact member by a person positioned generally to view the virtual image;

wherein the optical means includes a beamsplitter and correcting means for optically correcting inversion of a virtual image formed by the beamsplitter.

67. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image;

the surface portion being operatively contactable with a contact member by a person positioned generally to view the virtual image;

wherein the optical means includes a beamsplitter and correcting means for optically correcting inversion of a virtual image formed by the beamsplitter; and wherein the correcting means includes a front surface mirror in an optical path between the display screen and the digitizing surface.

68. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image; and the surface portion being operatively contactable with a contact member by a person positioned generally to view the virtual image;

wherein the optical means includes a partially reflective beamsplitter and forming means optically associated with the beamsplitter for forming an erect virtual image of the electronic display.

69. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image;

the surface portion being operatively contactable with a contact member by a person positioned generally to view the virtual image;

wherein the optical means includes a partially reflective beamsplitter and forming means optically associated with the beamsplitter for forming an erect virtual image of the electronic display; and wherein the forming means includes a partially-reflective convex mirror between the beamsplitter and the digitizing surface.

70. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image; and the surface portion being operatively contactable with a contact member by a person positioned generally to view the virtual image;

wherein the optical means includes a partially reflective beamsplitter and the virtual image is an uninverted virtual image of the electronic display.

71. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image;

the surface portion being operatively contactable with a contact member by a person positioned generally to view the virtual image;

wherein the optical means includes a partially reflective beamsplitter and the virtual image is an uninverted virtual image of the electronic display; and wherein the optical means includes a front surface, convex mirror at a right angle to a view of the person of the digitizing surface.

72. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image; and the surface portion being operatively contactable with a contact member by a person positioned generally to view the virtual image;

wherein the optical means includes forming means for forming a first virtual image of the electronic display, superimposing means for superimposing the first virtual image onto the digitizing surface and reflecting means for reflecting the first virtual image from the forming means to the superimposing means.

73. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image;

the surface portion being operatively contactable with a contact member by a person positioned generally to view the virtual image;

wherein the optical means includes forming means for forming a first virtual image of the electronic display, superimposing means for superimposing the first virtual image onto the digitizing surface and reflecting means for reflecting the first virtual image from the forming means to the superimposing means; and wherein the forming means is a negative lens, the superimposing means is a beamsplitter and the reflecting means is a front surface mirror.

74. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image; and the surface portion being operatively contactable with a contact member by a person positioned generally to view the virtual image;

wherein the optical means includes forming means for forming a virtual magnified image of the digitizing surface in the same plane as the virtual image of the electronic display.

75. A system, comprising:

a display screen;

a touch-sensitive digitizing surface;

optical means for optically superimposing on the digitizing surface a virtual image of an electronic display of the display screen;

the surface including a surface portion thereof corresponding to at least a portion of the virtual image;

the surface portion being operatively contactable with a contact member by a person positioned generally to view the virtual image;

wherein the optical means includes forming means for forming a virtual magnified image of the digitizing surface in the same plane as the virtual image of the electronic display; and wherein the optical means includes a beamsplitter and the forming means includes a positive lens between the beamsplitter and the digitizing surface.

76. A system, comprising:

a display screen;

a touch-sensitive digitizing surface;

a computer operatively connected to the display screen and to the digitizing surface; and a beamsplitter positioned to optically superimpose a virtual image of an electronic display of the display screen on the digitizing surface;

wherein the display screen is an interactive television screen.

77. A system, comprising:

a display screen;

a touch-sensitive digitizing surface;

a computer operatively connected to the display screen and to the digitizing surface;

a beamsplitter positioned to optically superimpose a virtual image of an electronic display of the display screen on the digitizing surface; and a front surface mirror positioned in an optical path between the display screen and the digitizing surface.

78. A system, comprising:

a display screen;

a touch-sensitive digitizing surface;

a computer operatively connected to the display screen and to the digitizing surface; and a beamsplitter positioned to optically superimpose a virtual image of an electronic display of the display screen on the digitizing surface wherein the beamsplitter is a partially reflective beamsplitter, and further comprising a partially-reflective convex mirror between the partially reflective beamsplitter and the digitizing surface.

79. A system, comprising:

a display screen;

a touch-sensitive digitizing surface;

a computer operatively connected to the display screen and to the digitizing surface;

a beamsplitter positioned to optically superimpose a virtual image of an electronic display of the display screen on the digitizing surface; and a negative mirror in line with a first optical path from the display screen to the beamsplitter, wherein the first optical path is perpendicular to a second optical path from the beamsplitter to the digitizing surface.

80. A system, comprising:

a display screen;

a touch-sensitive digitizing surface;

a computer operatively connected to the display screen and to the digitizing surface;

a beamsplitter positioned to optically superimpose a virtual image of an electronic display of the display screen on the digitizing surface; and a front surface mirror in an optical path between the display screen and the beamsplitter and a negative lens between the display screen and the front surface mirror.

81. A system, comprising:

a display screen;

a touch-sensitive digitizing surface;

a computer operatively connected to the display screen and to the digitizing surface;

a beamsplitter positioned to optically superimpose a virtual image of an electronic display of the display screen on the digitizing surface; and a positive lens between the beamsplitter and the digitizing surface.

82. A system, comprising:

a display screen;

a touch-sensitive digitizing surface;

a computer operatively connected to the display screen and to the digitizing surface;

a beamsplitter positioned to optically superimpose a virtual image of an electronic display of the display screen on the digitizing surface; and a front surface mirror operatively between the display screen and the beamsplitter.

* * * * *

UNITED STATES PATENT AND TRADEMARK OFFICE
CERTIFICATE OF CORRECTION

PATENT NO. : 6,252,720 B1  Page 1 of 1
DATED : June 26, 2001
INVENTOR(S) : Haseltine It is certified that error appears in the above-identified patent and that said Letters Patent is hereby corrected as shown below:

<u>Title page,</u>
Item [73], Assignee, should read as:

-- [73] Assignee: Disney Enterprises, Inc., 500 South Buena Vista Street, Burbank, California 91521. --

Signed and Sealed this

Thirteenth Day of May, 2003

JAMES E. ROGAN
*Director of the United States Patent and Trademark Office*